June 30, 1942.   F. A. LOWER   2,288,534
INDICATING INSTRUMENT
Filed Nov. 8, 1941   2 Sheets-Sheet 1
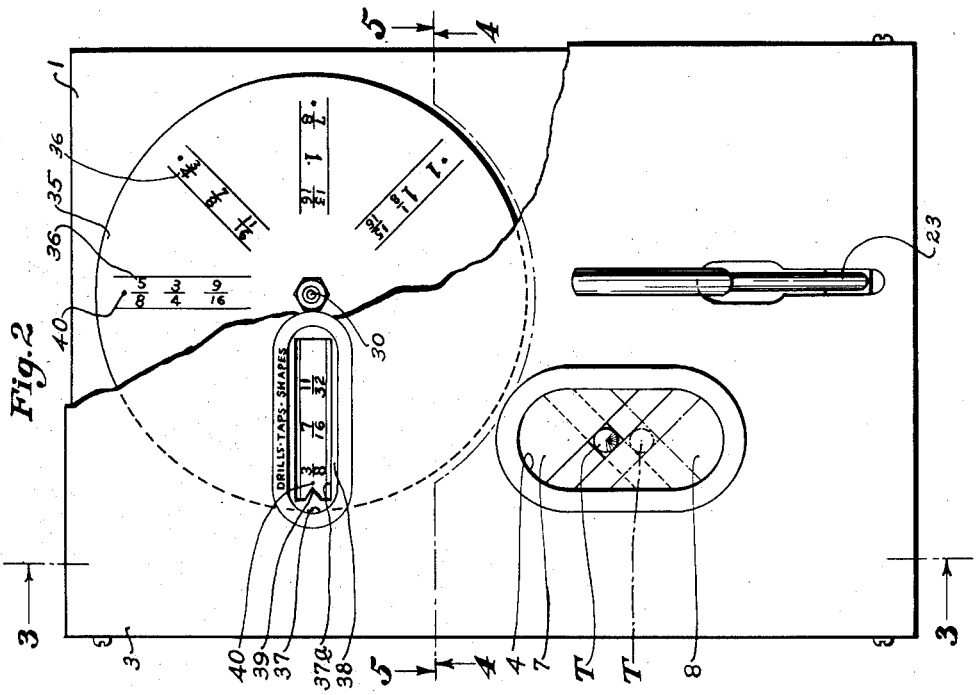
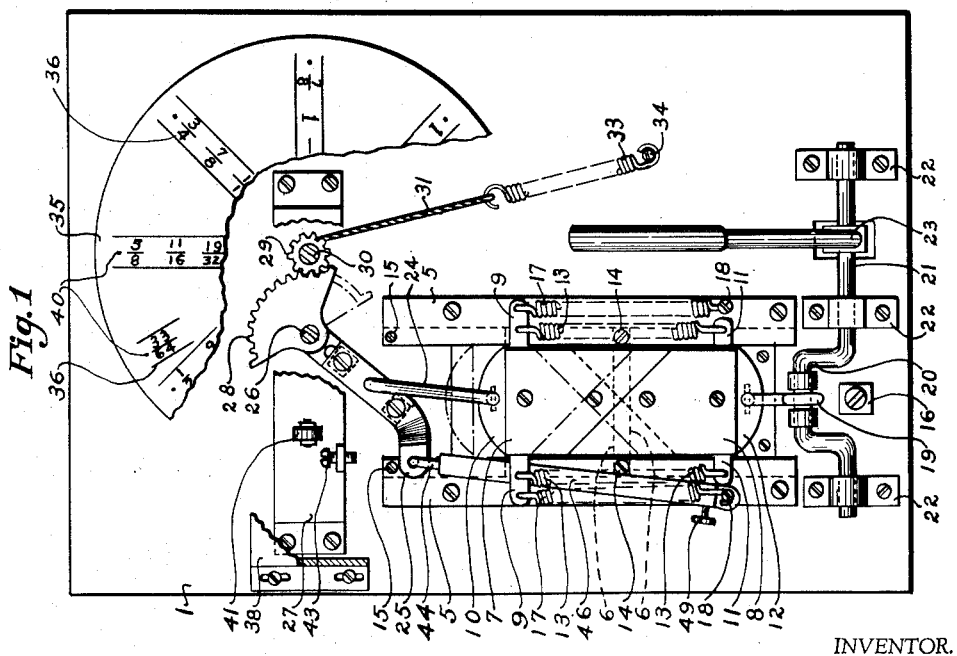
INVENTOR.
Fredrick A. Lower
BY
ATTORNEY June 30, 1942.  F. A. LOWER  2,288,534
INDICATING INSTRUMENT
Filed Nov. 8, 1941   2 Sheets-Sheet 2
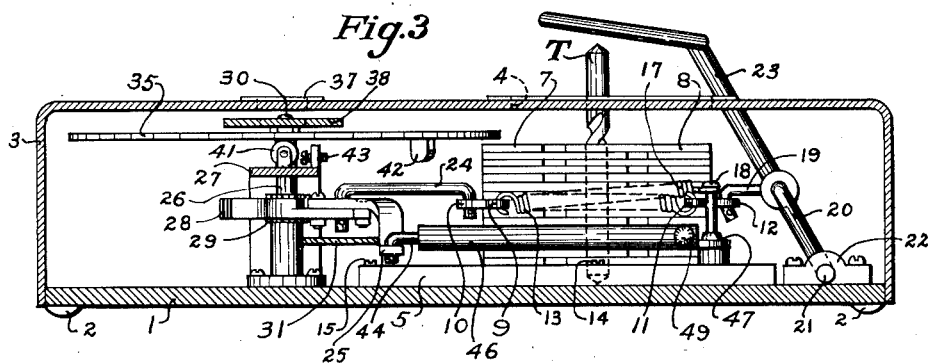
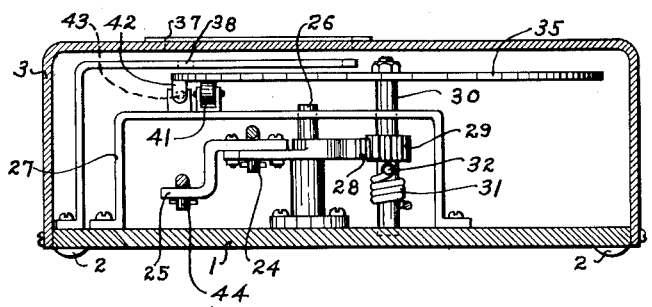
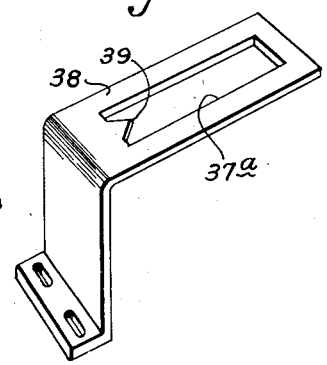
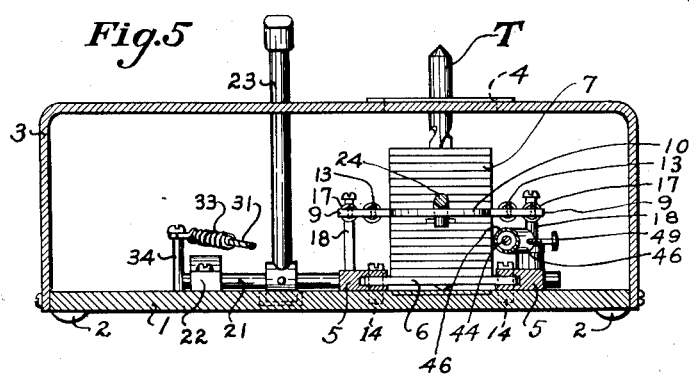
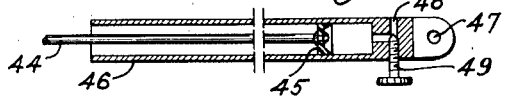
INVENTOR.
Fredrick A. Lower
ATTORNEY Patented June 30, 1942

2,288,534

UNITED STATES PATENT OFFICE 2,288,534

INDICATING INSTRUMENT

Fredrick A. Lower, Wichita Falls, Tex.

Application November 8, 1941, Serial No. 418,408

12 Claims. (Cl. 33—178)

This invention relates to an improvement in indicating instruments, particularly for determining the size of a drill, reamer, tap, or the like.

It is often desirable to determine the size of a round bar which may constitute the body of any one of several forms of tools, such as twist drills, spiral reamers, fluted taps, or the like, to determine accurately the diameter thereof, which has not been capable of measurement heretofore, except by means of special tools which require a considerable amount of time to obtain such measurement.

The object of this invention is to provide for an indication of the size of such tools in a device which may be simple in construction, easy and accurate in its operation, and will readily indicate, without loss of time, the size of the tool desired to be tested. This may be accomplished in the present indicating instrument by any ordinary mechanic without special training merely by the insertion of the tool into the instrument, manipulation of the latter, and reading from the dial the desired information, such as the diameter of the tool thus tested.

This is accomplished preferably by an instrument which utilizes a pair of coacting elements which are adapted to receive the tool therebetween and according to the spacing thereof, to cause an indication of the size or diameter of the tool. Provision is made for movement of one of the elements to separate the same from the other for receiving the tool, while the other element is constructed to operate the indicating means.

A preferred embodiment of the invention is shown in the accompanying drawings, in which:

Fig. 1 is a top plan view of the instrument, with the cover removed and with parts broken away and in section;

Fig. 2 is a top plan view of the instrument with a portion of the cover broken away;

Fig. 3 is a longitudinal section thereof on the line 3—3 of Fig. 2;

Fig. 4 is a cross section thereof on the line 4—4 of Fig. 2;

Fig. 5 is a similar view on the line 5—5 thereof;

Fig. 6 is a plan view of one of the V-blocks removed;

Fig. 7 is a perspective view of the pointing element, detached; and

Fig. 8 is a longitudinal sectional view through the dash pot, removed.

The instrument is constructed, as shown in the drawings, of a base 1, having supporting feet 2, on the lower side thereof, to hold the base elevated from its support. A cover 3 extends over the base 1, and encloses the operating mechanism of the instrument, said cover being detachably secured to the base. An opening 4 is provided in the cover 3 for the insertion of the tool to be measured therethrough.

Mounted on the base 1, beneath the opening or window 4 are a pair of opposed coacting guideways 5, which slidably receive therebetween supporting plates 6 spaced lengthwise from each other along the guideways 5. V-blocks 7 and 8 are secured upon the supporting plates 6 immediately beneath the opening or window 4 in position to receive the tool therebetween.

Each of the V-blocks 7 and 8 is shown as constructed of laminated sheet metal segments piled one upon another in superposed relation, with each of the segments having its inner end cut at an angle of 45° to the length thereof, with the angle of cut of one segment at an angle of 90° to that of the next adjacent segment, thus providing a V-shaped notch in the inner end thereof. The inner end of one V-block has the laminations thereof arranged so as to be complementary with the laminations of the inner end of the coacting V-block, whereby they fit together, as shown in Figs. 1 and 2, and when slid apart, form an orifice therebetween adapted to receive the tool that is inserted through the opening or window 4. The number of laminations in each block may be varied as desired, according to the size and length of the tools to be tested.

One of the laminations of the V-block 7 is specially formed with projecting ears 9, at opposite sides of said block and with a tongue 10 at the end thereof. A corresponding lamination of the V-block 8, has laterally projecting ears 11 thereon and an end tongue 12. The ears 9 and 11 at each opposite side of the coacting blocks 7 and 8 are connected together by coil springs 13, tending to draw the blocks together in opposed coacting relation, the inward movement of the respective V-blocks being limited by set scews 14, which extend through the guideways 5 in the path of movement of the plates 6 therein, thus tending to center the respective V-blocks relative to the base. Outward movement of the V-block 7 is limited by stops 15, while outward movement of the V-block 8 is limited by a stop 16, arranged respectively in the paths of movement of the supporting plates 6 of the respective V-blocks. Additional springs 17 are connected at one end with the ears 9 of the V-block 7, and at the opposite end at stationary points 18 with the guideways 5, thus tending to move the V- block 7 in an inward direction toward its coacting block 8, and to center the same relative to the instrument.

For manipulating the instrument, the tongue 12 of the V-block 8 is connected by means of a link 19 with a crank 20 formed in a shaft 21 extending transversely of the base 1, as shown in Fig. 1. The shaft 21 is journaled in bearings 22 on the base for turning movement relative thereto when operated by a handle 23 that extends upwardly through the cover 3, as shown in Figs. 2 and 3.

The tongue 10 of the other V-block 7 is connected by a link 24 with a lever 25 pivotally mounted on a shaft 26 (Figs. 1 and 4), which shaft 26 is journaled in a bearing on the base 1, and also in a bracket 27 that extends transversely thereover and is secured upon the base. One end of the lever 25 is formed with a gear segment 28 in position to mesh with a pinion 29 fixed on a shaft 30, rotatably supported in bearings mounted upon the base 1 and upstanding therefrom.

A flexible device is adapted to be connected with the shaft 30 for rotating the same at least in one direction, which device is shown as a coiled cord 31 wound on the shaft, with one end of said cord secured thereto at 32 (Fig. 4), while the opposite end of the cord is attached to an end of a coiled spring 33 (Fig. 1) anchored at 34 to the base 1. This spring and cord tends to return the shaft 30 to its initial set position after the parts have been operated to obtain the desired measurement of the tool.

Also mounted on the shaft 30 is a dial 35 which is fixed to the shaft to be rotated thereby. The upper face of the dial carries indicia 36 thereon, as shown in Figs. 1 and 2, in such position as to be exposed through a window 37 formed in the cover 3, as the dial is rotated during the operation of the instrument. Although the cover may contain a sufficient indicator for coaction with the indicia 36, a separate indicator is shown as a bracket 38 secured to the base 1 and overlying the dial 35. The bracket 38 has an indicating slot 37a therein (Fig. 7), at one end of which is formed a pointer 39 in position to co-act with the indicia 36, so as to indicate the size of the tool being tested. To provide for more accurate indication, not only of the size of the tool, but also whether or not the tool is slightly over-sized or under-sized, an indication such as a point 40, may be provided on the dial for accurate registry with the pointer 39, to obtain exact reading of the size when desired.

The dial is shown as graduated in common fractions, although other units of measurement may be used, if desired, according to the tools to be tested thereby. Provisions may be made also, as indicated on the drawings, not only for indicating the exact size of the tool being tested, as, for instance, a particular drill size, but also to indicate separately a coacting tap size in alignment with the drill size, so that workmen can measure the drill and this will give the correct tap size to be used therefor, making it unnecessary to refer specifically to hand books in order to obtain this additionl information.

It is preferable to have the ratio between the gear segment 28 and the gear pinion 29, such that greater movement of the dial 25 is obtained than the movement of the V-block 7, whereby wider spacing of the indicia 36 can be provided on the dial to produce more accurate measurement of the tool. In the present instrument, the parts are so constructed and arranged that movement of the V-block 7 through 1/64 inch will cause turning movement of the outer periphery of the dial 35 through 3/8 inch.

As shown in Figs. 1 and 4, the dial 35 is supported beneath the window 37 by a roller 41 supported on the bracket 27. A stop 42 is fixed to the underside of the dial 35 in position to be engaged by an adjusting screw 43 also supported on the bracket 27 in the path of movement of the stop 42 when the dial returns to zero position. The screw 43 may be adjusted to vary the setting of the zero position of the dial.

The end of the lever 25 opposite the gear segment 28 has a rod 44 connected therewith and extending to a piston 45 (Fig. 8) slidably mounted in a cylinder 46, one end of which is pivotally supported at 47 on a guideway 5. One end of the cylinder 46 is closed to form an air chamber, with an orifice 48 open thereto under control of a valve 49 adapted to be regulated by a thumb screw to vary the amount of air admitted to or discharged from the cylinder. This cylinder and piston thus forms a dash pot, so as to check the movement of the dial 35, and particularly the return movement thereof when released, under the action of the springs 17 and 33.

When it is desired to gauge a tool in the instrument, the handle 23 is pulled forward (to the right in Fig. 3), so as to move the V-block 8 in an outward direction, separating the same from the coacting V-block 7, providing an opening therebetween at the point of the dotted line position of the tool T in Fig. 2. The tool is inserted through the window or opening 4 into this opening between the V-blocks, and the handle 23 is then released. The action of the springs 13, tending to center the V-blocks will then move these bodily, moving the tool T to its full line position in Fig. 2. During this movement, the V-block 7 has been pushed forward against the stop 14, imparting a forward movement to the link 24 to swing the lever 25 about the shaft 26, and turning the gear segment 28 to rotate the pinion 29. This rotary movement also turns the dial 35 relative to the window 37, moving the proper indicia 36 into registry with the pointer 39, according to the size of the tool thus inserted. The workman may thus obtain an accurate measurement of the tool from the indication appearing in the window 37, which will show also whether or not the tool is over-sized or under-sized, and according to the illustrated embodiment, the proper tap size for the drill thus measured.

Upon removal of the tool from between the V-blocks, the spring 33 will rotate the shaft 30, so as to return the dial 35 to its zero position under the control of the dash pot 46—49, and the springs 17 will also return the V-block 7 and its connected parts to their initial positions.

In this way, it is possible in a very simple manner, to obtain an accurate indication of the size of various tools, without special calculating or complicated measurement thereof, which indication may be obtained by any ordinary workman without special training. This is particularly advantageous where numerous tools are used that are not ordinarily marked as to sizes, and it makes unnecessary the special marking and separation of such tools as has been required heretofore.

The angular character of the V-block surfaces permits these to be ground easily and accurately, thus obtaining an accurate fit on the tool.

I claim:

1. An indicating instrument comprising a pair of coacting elements adapted to receive a tool therebetween, each of said elements being constructed of a plurality of opposed laminations, each lamination having an inner face complementary to an inner face of the corresponding opposed lamination of the other coacting element and in position for direct abutting relation with said opposed lamination, and means operatively connected with at least one of said elements for indicating the spacing thereof by the tool.

2. An indicating instrument comprising a pair of coacting blocks adapted to receive a tool therebetween, supporting means for the blocks constructed for relative sliding movement thereof toward and from each other, resilient means connected with one of the blocks tending to move the same toward the other, and means operatively connected with at least one of the blocks for indicating the spacing of the blocks by the tool.

3. An indicating instrument comprising a pair of coacting blocks adapted to receive a tool therebetween, each of said blocks being constructed of a plurality of opposed laminations, each lamination having an inner face complementary to an inner face of the corresponding opposed lamination of the other coacting block and in position for direct abutting relation with said opposed lamination slidable supporting means for the blocks constructed for relative sliding movement thereof toward and from each other, and means operatively connected with one of the blocks for indicating the size of the tool according to the spacing of the blocks.

4. An indicating instrument comprising a pair of coacting blocks adapted to receive a tool therebetween, slidable supporting means for the blocks constructed for relative sliding movement thereof toward and from each other, means connected with one of the blocks for moving said block in one direction away from the coacting block to receive the tool therebetween, said moving means thereafter moving the blocks jointly in the opposite direction with the tool therebetween, means for limiting the last-mentioned movement of the blocks, and means operatively connected with the other of the blocks for indicating the size of the tool according to the spacing of the blocks when moved jointly.

5. An indicating instrument comprising a pair of coacting blocks adapted to receive a tool therebetween, slidable supporting means for the blocks constructed for relative sliding movement thereof toward and from each other, and means operatively connected with one of the blocks for indicating the size of the tool according to the spacing of the blocks, each of said blocks being constructed of laminations with the inner face of each lamination extending transversely of the direction of sliding movement of the block on opposite sides of the center thereof and complementary to an inner face of a corresponding opposed lamination of the other coacting block and in position for direct abutting relation with said opposed lamination.

6. An indicating instrument comprising a pair of coacting blocks adapted to receive a tool therebetween, slidable supporting means for the blocks constructed for relative sliding movement thereof toward and from each other, and means operatively connected with one of the blocks for indicating the size of the tool according to the spacing of the blocks, each of said blocks being constructed of laminations with the inner face of each lamination extending transversely of the direction of sliding movement of the block on opposite sides of the center thereof and complementary to an inner face of a corresponding opposed lamination of the other coacting block and in position for direct abutting relation with said opposed lamination, the inner end of each lamination being formed at an acute angle to the length of the block and to the direction of sliding movement thereof, and the inner ends of alternate laminations being arranged at angles to each other.

7. An indicating instrument comprising a pair of coacting blocks adapted to receive a tool therebetween for gauging the size thereof, supporting means for the blocks, guideways slidably receiving and mounting said supporting means for sliding movement of the blocks toward and from each other, resilient means tending to move the blocks toward each other, and means connected with one of the blocks for indicating the spacing of the blocks with the tool therebetween.

8. An indicating instrument comprising a pair of coacting blocks adapted to receive a tool therebetween for gauging the size thereof, supporting means for the blocks, guideways slidably receiving and mounting said supporting means for sliding movement of the blocks toward and from each other, resilient means connecting the blocks together tending to move the same into abutting relation, operating means connected with one of the blocks for separating the same from the other block, and indicating means connected with the other block for indicating the relative separation of the respective blocks.

9. An indicating instrument comprising a pair of coacting blocks adapted to receive a tool therebetween for gauging the size thereof, supporting means for the blocks, guideways slidably receiving and mounting said supporting means for sliding movement of the blocks toward and from each other, means for indicating the relative separation of the blocks by the tool, and resilient means tending to return the blocks and indicating means to initial set positions.

10. An indicating instrument comprising a pair of coacting blocks adapted to receive a tool therebetween for gauging the size thereof, supporting means for the blocks, guideways slidably receiving and mounting said supporting means for sliding movement of the blocks toward and from each other, a rotatable dial having indicia thereon, a lever, gearing operatively connecting said lever with the dial for turning movement of the dial thereby, means operatively connecting one of the blocks with the lever, and indicating means coacting with the indicia on the dial to indicate the separation of the blocks from each other.

11. An indicating instrument comprising a pair of coacting blocks adapted to receive a tool therebetween for gauging the size thereof, supporting means for the blocks, guideways slidably receiving and mounting said supporting means for sliding movement of the blocks toward and from each other, a lever operatively connected with one of the blocks and pivotally mounted for swinging movement, a shaft having geared connection with the lever for turning movement thereby, a dial fixed on said shaft and having indicia thereon, and means coacting with the indicia to indicate the relative separation of the blocks.

12. An indicating instrument comprising a pair of coacting blocks adapted to receive a tool therebetween for gauging the size thereof, supporting means for the blocks, guideways slidably receiving and mounting said supporting means for sliding movement of the blocks toward and from each other, a lever operatively connected with one of the blocks and pivotally mounted for swinging movement, a shaft having geared connection with the lever for turning movement thereby, a dial fixed on said shaft and having indicia thereon, means coacting with the indicia to indicate the relative separation of the blocks, resilient means connected with the shaft for returning the dial to a zero position, and fluid check means connected with the lever for cushioning the return movement thereof.

FREDRICK A. LOWER.